(No Model.)
A. JÖRGENSEN.
VELOCIPEDE.
No. 387,166. Patented July 31, 1888.
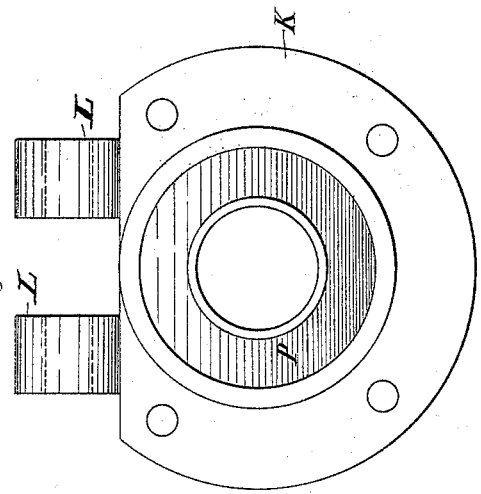
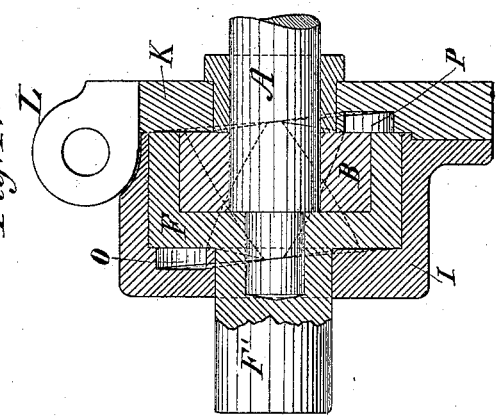
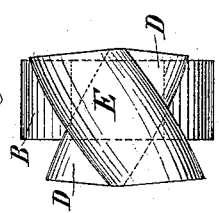
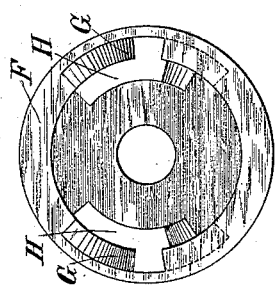
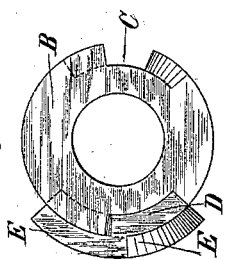
WITNESSES:
E. B. Bolton
INVENTOR:
Alfred Jorgensen,
By Henry Connett
Attorney

UNITED STATES PATENT OFFICE.

ALFRED JÖRGENSEN, OF HELSINGFORS, FINLAND, RUSSIA.

VELOCIPEDE.

SPECIFICATION forming part of Letters Patent No. 387,166, dated July 31, 1888.

Application filed March 31, 1888. Serial No. 269,081. (No model.) Patented in Sweden August 16, 1887, No. 1,155, and in France March 20, 1888, No. 189,485.

*To all whom it may concern:*

Be it known that I, ALFRED JÖRGENSEN, a subject of the Grand Duke of Finland, and a resident of Helsingfors, Finland, Russia, have invented certain Improvements in Centers for Velocipede-Wheels for Movable Cranks and the Like, (a patent having been granted in Sweden for said invention, dated August 16, 1887, No. 1,155, and in France, dated March 20, 1888, No. 189,485,) of which the following is a specification.

My invention relates to a means of connecting the cranks of a velocipede or bicycle to the wheel-shaft; and the object of the invention is to effect a periodical change of position of the cranks of a bicycle, (for example,) so that in working or running the bicycle one crank will always pass the dead-point immediately before or after the passage of said point by the other crank. This makes the treading of the cranks more uniform and less fatiguing. I effect the result by means of two devices, which I call "centers," secured to the wheel-shaft at its opposite ends, one for each crank.

In the drawings which serve to illustrate my invention I have shown but one center, as they will both be constructed on the same principle.

Figure 1 is an axial section of my improved center, the wheel-shaft being seen in elevation. Figs. 2, 3, 4, 5, and 6 illustrate the several parts of the center detached.

A is the wheel-shaft of the bicycle. On this shaft is rigidly fixed a cylindrical collar, B, which may be secured in place by a key or in any of the various ways known in the arts. In the face or periphery of this collar are formed on diametrically-opposite sides of its center two helical spline grooves or recesses, C, in the nature of spaces between long-pitched screw-threads. In Fig. 5, which is an edge or side view of collar B detached, one of these grooves C is shown, and in Fig. 3, which shows said collar in end elevation, the ends of said grooves may be seen.

Embracing the collar B is a cup-like socket, F, with which is integrally formed the crank-shaft F'. The shafts A and F' are axially aligned, as seen in Fig. 1. In the inner face of socket F, which embraces the collar B, are formed helical grooves G, of the same character as the grooves C in sleeve B, except that they twist in the opposite direction—that is, one is right hand and the other left hand.

Engaging the grooves C in the collar B is a twisted piece, D, which snugly fits the groove, and connected solidly or integrally with said piece D is a similar piece, E, which snugly fits the adjacent helical groove, G, in the socket F. In Fig. 4, which is a side view of the parts seen in Fig. 3, the form and arrangement of the pair of united pieces D and E, which I will call "helical splines," is clearly shown. In Fig. 1 the position of the pair of splines is indicated by dotted lines.

The splines D E are longer than the collar B, and in the bottom of socket F openings H H are provided for them to play through. These are seen in Fig. 6, which is an end view of socket F, (detached,) as seen from the right in Fig. 1.

From the foregoing description it will be obvious that if the parts described were assembled an endwise movement of the pair of helical splines would cause the shafts A and F' to rotate or make a partial revolution in opposite directions relatively.

The socket F and the parts within it are inclosed in a box consisting of two parts, I and K, secured together, the former being cup-like in form and the latter a plate closing said cup. This latter has on it two attaching-lugs, L, which are designed to embrace and be secured to a lug or provision on the bicycle-frame, whereby said box will be prevented from rotating with the wheel and other parts.

The ends of the inclosing-box are constructed to form cams, which act on the ends of the pairs of helical splines in such a manner as to impart to said splines an alternate endwise reciprocating motion as the wheel rotates and collar B carries said splines around. This cam construction is effected by cutting or forming circular grooves O and P in the respective ends of the box, the bottoms of said grooves forming planes that are parallel with each other, but inclined with respect to a plane at right angles to the axis of the wheel-shaft. This inclination is clearly illustrated in Fig. 1. These grooves form inclined tracks for the ends of the pairs of helical splines, and I prefer to so proportion the parts that the splines shall be substantially in contact at all times with these cam-surfaces at both ends. It follows from this construction that when the shaft A is driven from shaft F', as it will be when the bicycle is run with cranks and pedals, the shaft F' will have a slower motion than the shaft A during one half of its revolution and a more rapid motion than shaft A during the other half. The two centers—one for each crank—will be so disposed on a bicycle that the crank shall have a speedier motion on the upstroke and a slower one on the downstroke. From this it results that when one crank is passing the dead-point in the lower position the other crank will have already passed that point in its upper position. The treading is in this way made easier and the running of the bicycle more even.

I may say that my object in using the two helical splines D and E, with opposite inclines connected to form a pair, is to obtain with a given pitch of the helix the maximum rotary movement of collar B in respect to socket F with the minimum endwise displacement of the spline. I might make either one of these splines D or E straight, providing it, of course, with a straight groove to play in; but in this case the endwise movement required would be greater.

My only object in using two oppositely-arranged pairs of splines and grooves is to divide the strain. One pair or set would serve; but I prefer two, for the reasons given.

Having thus described my invention, I claim—

1. In a center for velocipedes and the like, the combination, with the wheel-shaft provided with a cylindrical collar having a helical spline-groove, and the crank-shaft provided with a socket embracing said collar, and said socket also provided with a spline-groove, of a pair of integral splines longer than said collar and occupying said spline-grooves, and two like stationary inclined cams arranged, as shown, with respect to the ends of said splines, whereby when the shafts are rotated said cams impart to said splines an alternating reciprocating movement in their respective grooves.

2. The combination, with the wheel-shaft, as A, provided with a cylindrical collar, B, having in its periphery a helical spline-groove, C, and the crank-shaft provided with a socket, F, which embraces the collar B, and which is also provided with a helical spline-groove, G, of the pair of integral helical splines D and E, occupying said spline-grooves, respectively, and the inclosing-box provided with cams, as described, for actuating said splines.

In witness whereof I have hereunto signed my name in the presence of two subscribing witnesses.

ALFRED JÖRGENSEN.

Witnesses:
 FRANS FALCKER,
 BERTH. WEBBERG.